United States Patent
Bender et al.

(10) Patent No.: US 9,906,481 B2
(45) Date of Patent: Feb. 27, 2018

(54) NOTIFICATION OF ELECTRONIC CONVERSATION

(71) Applicant: International Business Machines Corporation, Armonk, NY (US)

(72) Inventors: Michael Bender, Rye Brook, NY (US); David E. Nachman, Morristown, NJ (US); Michael P. Shute, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/250,417

(22) Filed: Apr. 11, 2014

(65) Prior Publication Data

US 2015/0295878 A1    Oct. 15, 2015

(51) Int. Cl.
| | | |
|---|---|---|
| G06F 3/00 | (2006.01) | |
| H04L 12/58 | (2006.01) | |
| G06F 17/30 | (2006.01) | |
| H04L 29/08 | (2006.01) | |

(52) U.S. Cl.
CPC ........ *H04L 51/24* (2013.01); *G06F 17/30864* (2013.01); *G06F 17/30979* (2013.01); *H04L 51/04* (2013.01); *H04L 51/32* (2013.01); *H04L 67/24* (2013.01)

(58) Field of Classification Search
None
See application file for complete search history.

(56) References Cited

U.S. PATENT DOCUMENTS

| | | | |
|---|---|---|---|
| 6,564,244 B1 | 5/2003 | Ito et al. | |
| 7,346,658 B2 | 3/2008 | Simpson | |
| 7,765,265 B1 * | 7/2010 | Granito | G06Q 10/107 |
| | | | 707/999.003 |
| 7,945,623 B2 | 5/2011 | Simpson | |
| 8,366,546 B1 * | 2/2013 | Naik | A63F 13/12 |
| | | | 463/31 |
| 8,780,163 B2 | 7/2014 | Cahill et al. | |
| 9,041,765 B2 | 5/2015 | Periyannan et al. | |
| 2002/0095465 A1 * | 7/2002 | Banks | H04L 12/1818 |
| | | | 709/206 |
| 2003/0028524 A1 * | 2/2003 | Keskar | G06Q 30/02 |
| 2003/0037112 A1 * | 2/2003 | Fitzpatrick | H04L 12/1813 |
| | | | 709/205 |

(Continued)

OTHER PUBLICATIONS

Appendix P, List of IBM Patents or Patent Applications Treated As Related, 2 pages, dated Feb. 2, 2016.

(Continued)

*Primary Examiner* — Hien Duong
(74) *Attorney, Agent, or Firm* — Christopher McLane; Jason H. Sosa

(57) ABSTRACT

A computer system identifies an electronic conversation between a plurality of participants. The computer system identifies the plurality of participants. The computer system determines whether the plurality of participants match a specific list of participants that have been predetermined to be of interest to a user. In response to determining that the plurality of participants engaged in the electronic conversation matches the predetermined list of participants of interest to the user, the computer system notifies the user of the electronic conversation.

17 Claims, 5 Drawing Sheets

(56) References Cited

U.S. PATENT DOCUMENTS

| | | | |
|---|---|---|---|
| 2003/0096621 A1* | 5/2003 | Jana | G08G 1/0104 |
| | | | 455/456.1 |
| 2004/0243941 A1* | 12/2004 | Fish | G06Q 10/107 |
| | | | 715/752 |
| 2005/0227676 A1* | 10/2005 | De Vries | H04L 12/5895 |
| | | | 455/414.1 |
| 2006/0046743 A1* | 3/2006 | Mirho | H04L 29/06 |
| | | | 455/456.3 |
| 2008/0022209 A1* | 1/2008 | Lyle | G06Q 10/107 |
| | | | 715/730 |
| 2009/0016510 A1 | 1/2009 | Becker et al. | |
| 2009/0075633 A1* | 3/2009 | Lee | H04M 1/72583 |
| | | | 455/412.2 |
| 2010/0036929 A1* | 2/2010 | Scherpa | G06Q 10/10 |
| | | | 709/207 |
| 2010/0057857 A1 | 3/2010 | Szeto | |
| 2012/0142429 A1* | 6/2012 | Muller | A63F 13/12 |
| | | | 463/42 |
| 2012/0182384 A1* | 7/2012 | Anderson | H04L 12/1827 |
| | | | 348/14.09 |
| 2013/0110933 A1 | 5/2013 | Appelman | |
| 2014/0024450 A1 | 1/2014 | Ramachandran et al. | |
| 2014/0278645 A1* | 9/2014 | Davidson | G06Q 10/063114 |
| | | | 705/7.15 |
| 2014/0344259 A1* | 11/2014 | Horling | G06F 17/3053 |
| | | | 707/723 |
| 2015/0149929 A1* | 5/2015 | Shepherd | H04L 65/403 |
| | | | 715/753 |
| 2015/0245168 A1 | 8/2015 | Martin | |
| 2016/0255476 A1* | 9/2016 | De Vries | H04L 67/141 |

OTHER PUBLICATIONS

Bender et al., "Notification of Electronic Conversation", U.S. Appl. No. 15/010,298, filed Jan. 29, 2016, 35 pages.

IBM, "Group Alert for Instant Messaging Clients", An IP.com Prior Art Database Technical Disclosure, Oct. 13, 2009, IPCOM000188535D.

* cited by examiner

NOTIFICATION OF ELECTRONIC CONVERSATION

FIELD OF THE INVENTION

The present invention relates generally to the field of electronic conversation, and more particularly to sending notification to a user of an electronic conversation service.

BACKGROUND OF THE INVENTION

Instant messaging allows users connected to the Internet to communicate between each other in real-time. Typically, a first user downloads an instant message program into their Internet-connectable computing device that can invoke a window that includes a section for typing messages and for showing a list of contacts to the first user. To use instant messaging, both users must be online at the same time and have their instant messaging software set to accept messages from each other. If a user attempts to send a message to another user who is not online, or who is not accepting instant messaging, the instant messaging service returns a notification to the sender indicating that the message transmission cannot be completed. If both users are online, and are accepting messages, then the users remain constantly connected to their instant messaging service. Through this constant connection, users receive the messages as quickly as the data can travel through the network, thereby avoiding the less immediate storage and downloading of data that is associated with e-mail communication.

In the operation of an instant messaging service, when a user logs on-to the service, the instant messaging software on the user's computer reports to the instant messaging server that the user is available to receive messages. The server then downloads to the user's computer a list of users who are currently online and logged into the instant messaging service. This contact list associates a group of users who have agreed to accept instant messages from each other. A user creates the contact list upon registration with the instant messaging service and can edit it at any time thereafter. The contact list indicates which users in the group are online and their availability or status. The instant messaging service updates the contact list as users change their status. Thus, a user who is online can continually view the online status of his associated contacts.

Some instant messaging applications also allow communications to be simultaneously transmitted among several users in real-time. More specifically, a first user of an instant messaging application may select, one at a time, a plurality of other users with whom the first user wishes to communicate, wherein the plurality of users are shown as being online. The first user can then initiate a communication to all selected users which allows the selected users and the first user to communicate with one another simultaneously in real-time. If one of the participants in the conversation closes a conversation window corresponding to the plurality of users and the first user, such participant cannot return to the conversation without being invited by one of the remaining participants. Further, if the same individuals wish to simultaneously communicate with one another at a later point in time, one of such individuals must initiate the conversation by manually selecting all of the individuals.

SUMMARY

Embodiments of the present invention disclose a method, computer program product, and system for notifying a user of an electronic conversation. A computer system identifies an electronic conversation between a plurality of participants. The computer system identifies the plurality of participants. The computer system determines whether the plurality of participants match a specific list of participants that have been predetermined to be of interest to a user. In response to determining that the plurality of participants engaged in the electronic conversation matches the predetermined list of participants of interest to the user, the computer system notifies the user of the electronic conversation.

DETAILED DESCRIPTION

Embodiments of the present invention recognize that it may be desirable for an online user of an instant messaging service to receive a notification of an electronic conversation taking place in which they may have interest. Towards that end, embodiments of the present invention provide the capability of notifying an online user when individuals of interest to said user enter into an electronic conversation, "chat", or "group chat". An electronic conversation can be any conversation in which one or more user is corresponding through an electronic medium such as a computer, cell phone, gaming device, etc. Chat or group chat can be used to describe an electronic conversation. Subsequent to identifying that such individuals have entered into an electronic conversation, the notification sent may include, a title, participant names, number of participants, time the discussion began, the participant that initiated the group, etc. The notification may comprise of an instant notification, via an instant message, text message, phone call, etc., or a notification the next time a user is online. Embodiments may also allow the user to contact a participant of the group and potentially to enter the conversation.

Implementation of such embodiments may take a variety forms, and exemplary implementation details are discussed subsequently with reference to the Figures.

Figure 1:
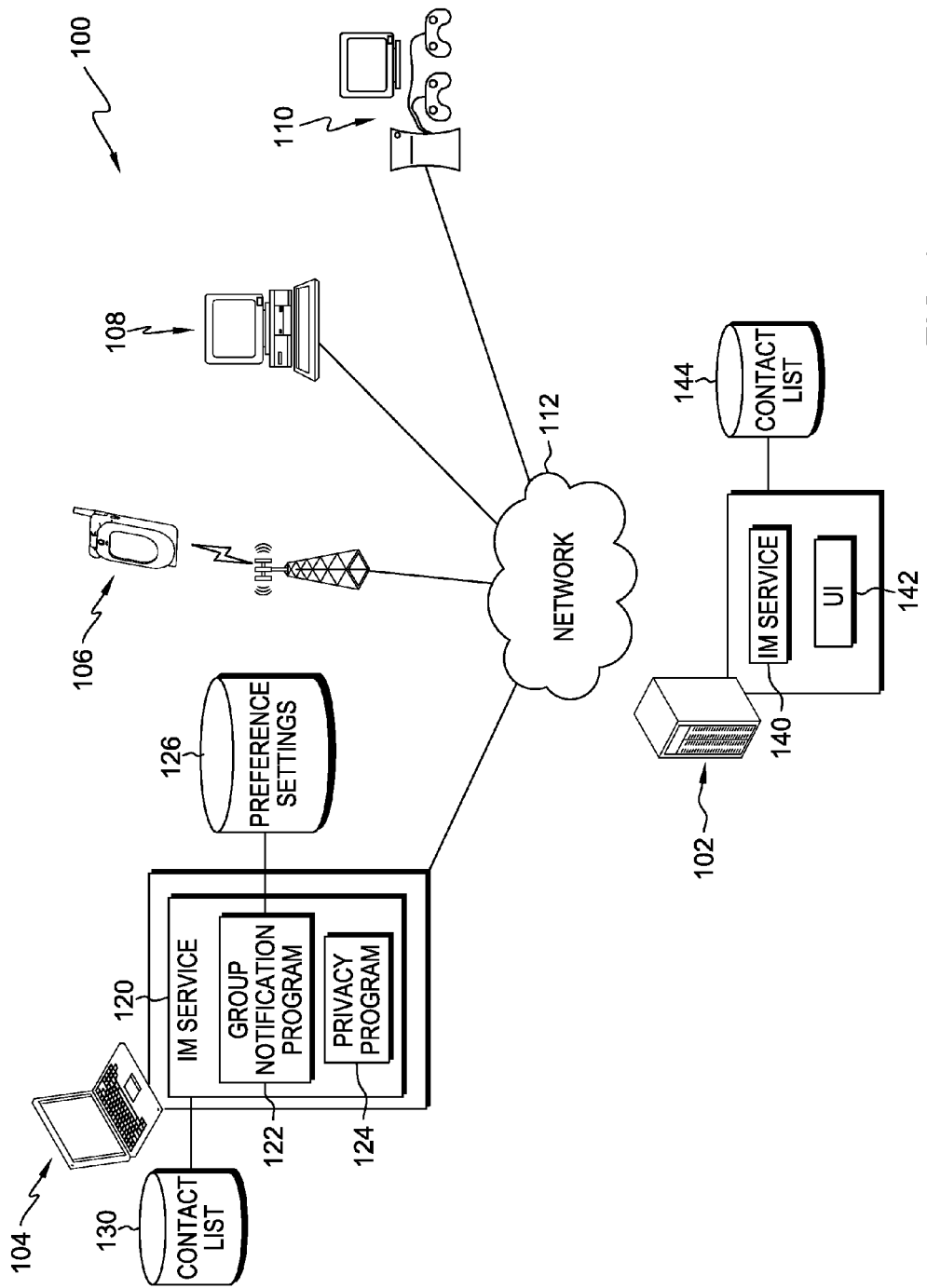
FIG. 1 is a functional block diagram illustrating a distributed data processing environment, in accordance with an embodiment of the present invention.

FIG. 1 is a functional block diagram illustrating a distributed data processing system, generally designated 100, in accordance with one embodiment of the present invention.

Distributed data processing system 100 includes server computer 102 and client computers 104, 106, 108, and 110 interconnected over network 112.

Server computer 102 may be a desktop computer, a laptop computer, a tablet computer, a specialized computer server, a smartphone, a gaming system, or any other computer system known in the art. In certain embodiments, server computer 102 represents a computer system utilizing clustered computers and components that act as a single pool of seamless resources when accessed through network 112, as is common in data centers and with cloud computing applications. In general, server computer 102 is representative of any programmable electronic device or combination of programmable electronic devices capable of executing machine readable program instructions and communicating with client computers 104, 106, 108, 110, via network 112. Exemplary components of client computer 104 are described in greater detail with regard to FIG. 5.

In various embodiments of the present invention, client computers 104, 106, 108, and 110 can each respectively be a laptop computer, a tablet computer, a netbook computer, a personal computer (PC), a desktop computer, a personal digital assistant (PDA), a smartphone, a gaming system, or any programmable electronic device capable of communicating with server computer 102 via network 112.

In general, network 112 can be any combination of connections and protocols that will support communications between server computer 102 and client computers 104, 106, 108, and 110. Network 112 can include, for example, a local area network (LAN), a wide area network (WAN) such as the internet, a cellular network, or any combination of the preceding, and can further include wired, wireless, and/or fiber optic connections.

Instant messaging service 140 resides on server computer 102 and facilitates the maintenance of contact list 144, and the communication or sharing of information between such contacts. Instant messaging service 120 resides on client computer 104 and sends or receives information with instant messaging service 140 located on server computer 102. In one embodiment, server computer 102 is a server computer system accessible to a plurality of users of instant messaging service 120, e.g. the respective users of client computers 104-110, and instant messaging service 120 is a server application maintaining separate contact lists, e.g. contact list 144, for each respective user of client computers 104-110 and facilitating communication between the users. In such an embodiment, user interface 142 may be a web-based user interface accessible to each respective user via network 112. For instance, instant messaging server computer 102 can receive the group creation request from instant messaging service 120 on client computer 104. The request can be received by server computer 102 by way of any suitable network 112. Received communications and information may be displayed to the user of server computer 102 through user interface 142 and messages and instructions may be received from the user through user interface 142.

Group notification program 122 monitors the ongoing conversations of the instant messaging service 120 and the availability status of the users. Based upon results of such monitoring, group notification program 122 sends a notification to a user on client computers 104-110 listing ongoing group chats by utilizing a list of participants previously selected in their group preference settings 126. An exemplary implementation of group notification program 122 is discussed with regard to FIG. 3.

As depicted, group notification program 122 is a subprogram or routine of instant messaging service 120. In an alternative embodiment, group notification program 122 may be independent of instant messaging service 120 and capable of communicating or interacting with instant messaging service 120. In some embodiments, group notification program 122 may monitor ongoing electronic conversations of multiple instant messaging services to gather additional members.

In one embodiment, privacy program 124 may monitor the privacy settings of the instant messaging service 120 and the availability of the users. Based upon results of such monitoring, privacy program 124 sends a notification to instant messaging service 120 detailing the status of its users to be stored in contact list 130.

Client computer 104 contains instant messaging service 120 and can be used by a user to initiate an electronic conversation creation request. An embodiment of an electronic conversation creation request may comprise a user selecting from a list of active instant messaging participants and sending an invite to a participant to join in a conversation. In one embodiment, instant messaging service 120 located on client computer 104 would send a request to server computer 102 which would be processed by instant messaging service 140. In another embodiment, instant messaging service 140 located on server computer 102 would send a notification of an ongoing electronic conversation to instant messaging service 120 located on client computer 104 via network 112.

Figure 2:
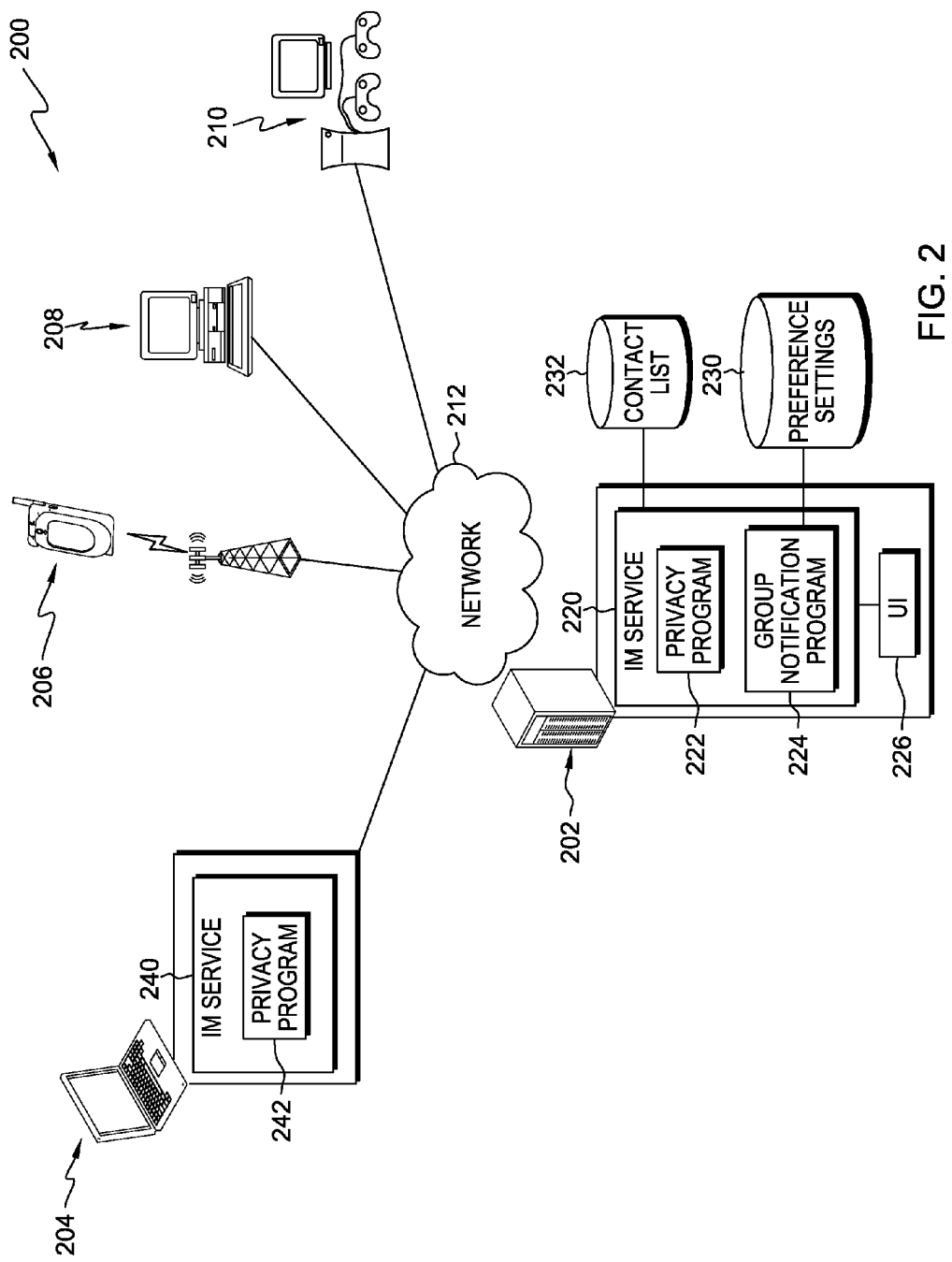
FIG. 2 is an alternative functional block diagram illustrating a distributed data processing environment, in accordance with an embodiment of the present invention.

FIG. 2 is a functional block diagram illustrating a distributed data processing system, generally designated 200, in accordance with an alternative embodiment of the present invention. Distributed data processing system 200 includes server computer 202 and client computers 204, 206, 208, and 210 interconnected over network 212. Exemplary components of server computer 202 are described in greater detail with regard to FIG. 5.

In this embodiment, the environment is similar to the environment in FIG. 1; however, group notification program 224 is a subprogram of instant messaging service 220 located on server computer 202. In the depicted environment, an embodiment might include group notification program 224 sending a notification to a user on client computers 204-210 that an ongoing electronic conversation with one or more participant is taking place that fits their group preference settings 230.

In the embodiment depicted in FIG. 2, server computer 202 hosts instant messaging service 220, subprograms privacy program 222, and group notification program 224. In an alternate embodiment, privacy program 222 and group notification program 224 may be independent programs that function separately from instant messaging service 220. In a server-oriented embodiment, group notification program 224 accesses information located on server computer 202 to determine if a notification is needed on client computers 204-210 via network 212. In such an embodiment, group notification program 224 may instead monitor hosted electronic conversations and intelligently compare participants to various preference lists. Group notification program 224, upon identifying electronic communications between specific participants, may subsequently notify users that would be interested.

Ultimately, group notification program 224 may use any number of factors to determine whether to send a notification of an ongoing electronic conversation to a user. These factors may include the amount of people participating in an electronic conversation, the specific participants of the conversation, the specific time of the conversation, the proximity of the participants, and the duration of time the participants have been engaged in an electronic conversation.

Figure 3:
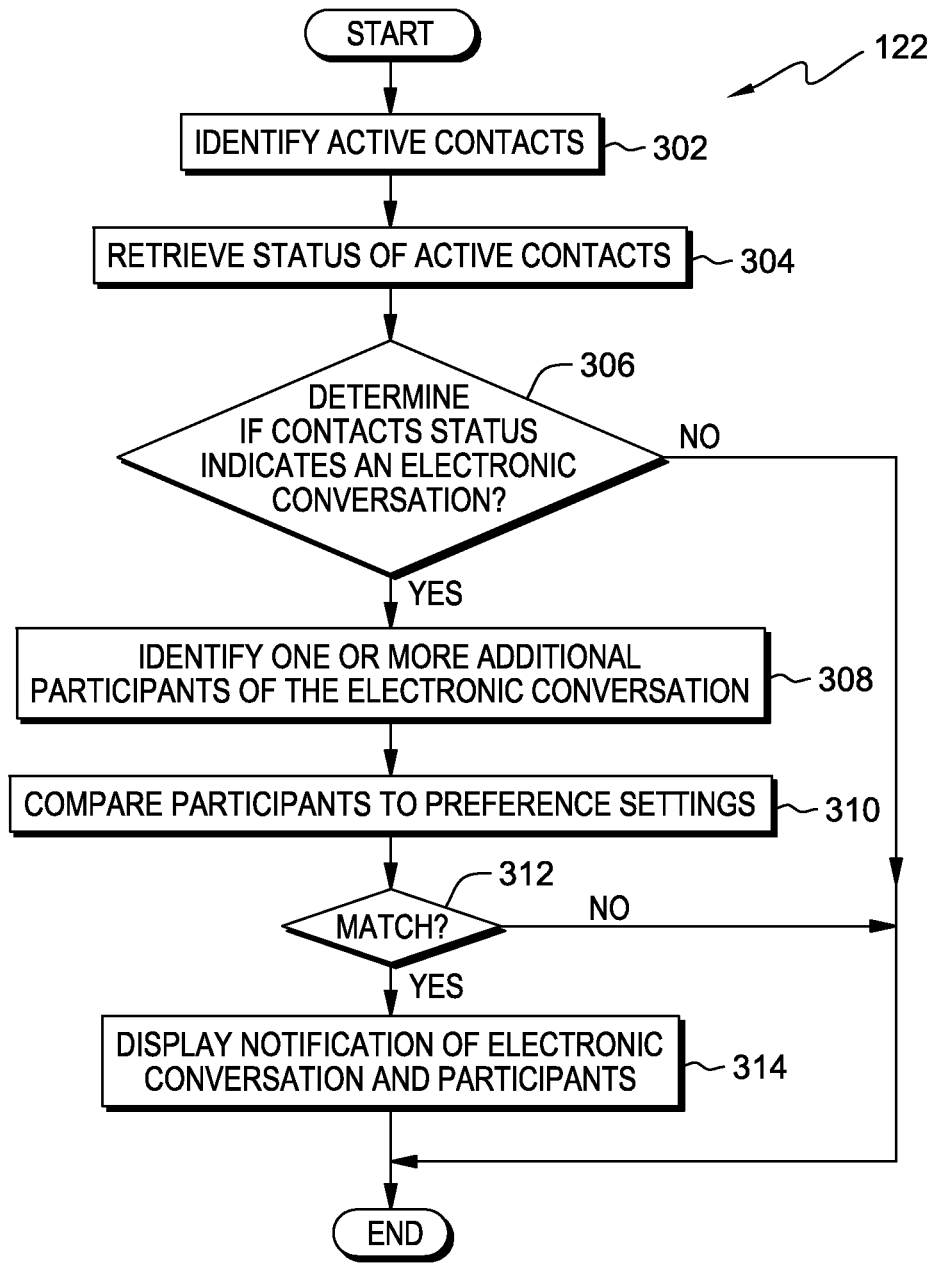
FIG. 3 is a flowchart depicting operational steps of one exemplary implementation of a group notification program located on a client computer, within the data processing environment, providing notifications of ongoing electronic conversations with more than one participant, in accordance with an embodiment of the present invention.

FIG. 3 is a flowchart depicting operational steps of one exemplary implementation of group notification program 122, located on client computer 104, providing notifications of ongoing electronic conversations, in accordance with an embodiment of the present invention.

Group notification program 122 identifies active contacts for a user of instant messaging service 120 located on client computer 104 (step 302). In a preferred embodiment, group notification program 122 identifies the active contacts by searching contact list 130 to determine if participants of instant messaging service 120, that a user of client computer 104 had previously deemed important, are currently online and using their own instance of instant messaging service 120. Typically, a local instance of instant messaging service 120 queries instant messaging service 140 on server computer 102 for status updates of each member on contact list 130. In another embodiment, group notification program 122 may search an address book, recent telephone calls, recent text messages, recent gaming interactions, recent social media interaction, or email contacts for active participants of instant messaging service 120. For example, group notification program 122 may generate a list of potential contacts from such sources, then query instant messaging service 140, to determine if those contacts are members of instant messaging service 140, and are active.

Group notification program 122 retrieves the status of the active contacts for a user of instant messaging service 120 located on client computer 104 (step 304). In a preferred embodiment, group notification program 122 retrieves the status such as available, away, in a meeting, etc. Additional status indicators could also be retrieved including one that indicates that a contact is "chatting", or one could indicate who they are engaged in an electronic conversation with. In such an example, the information may be visible to the user of client computer 104, or it could be "hidden" data accessible only to instant messaging service 120. To implement this, instant messaging service 120, located on client computer 104, could query instant messaging service 140 located on server computer 102.

In another embodiment, group notification program 122 may retrieve information regarding the physical location of a user of instant messaging service 120 as well as availability status. For example, group notification program 122 can query instant messaging service 140, located on server computer 102, for the location of the user. Another example could comprise a further step in which server computer 102 sends a request to the participants in the electronic conversation to determine their respective locations. Yet another example may find certain users of instant messaging service 120 using privacy program 124 to hide their status, not show certain users their status, hide their location, or show that they are not online. In such cases, group notification program 122 may not be able to retrieve a user status or even identify if they are active.

Group notification program 122 determines if a contact is engaged in an electronic conversation (decision 306). In one embodiment, after group notification program 122 searches members of contact list 130 for online users, it then sends a query to instant messaging service 140, located on server computer 102, to determine if the online contact(s) is engaged in an electronic conversation. In another embodiment, group notification program 122 may determine this based on a received status. Embodiments of the electronic conversation could comprise video chat, voice chat, text conversations, or any other possible way to communicate with instant messaging service 120. In one embodiment, when group notification program 122 determines that no the status of contacts indicate no ongoing electronic conversation (no branch, decision 306), the program would go to end.

When group notification program 122 determines that a contact status indicates an electronic conversation (yes branch, decision 306), group notification program 122 identifies one or more participants of the electronic conversations that are ongoing (step 308). For electronic conversations that are ongoing and were located, group notification program 122 identifies the participants that are involved in the electronic conversation. In one embodiment this could comprise just one other participant or multiple participants. Participants could include humans, automated programs, etc. As discussed previously, information as to whom a user is in conversation with may be included in a received status of the user. Alternatively, subsequent to identifying that a particular contact is in an electronic conversation, group notification program 122 may query the server for participant information. In another embodiment, a user may be involved in an electronic conversation, but the user is utilizing privacy program 124 to hide the conversation. In such an embodiment, the user would not be viewed as being involved in an electronic conversation but could be added to the number of people involved in the conversation.

Group notification program 122 compares the list of participants engaged in electronic conversations generated during step 308 with group preference settings 126 (step 310), and then determines if there are any matches (decision 312). In one embodiment, a user of client computer 104 may predefine group preference settings 126 as to set a list or group of users that they would want to be notified about if said users were involved in an electronic conversation via instant messaging service 120. An embodiment may include members of a team that the user of client computer 104 is associated with, and that team could be engaged in an instant messaging chat via network 112. A match would occur when participants of an electronic conversation were also selected in group preference settings 126. For example, the user of client computer 104 may select to be notified when participants A, B, and C are engaged in an electronic conversation in group preference settings 126. If all three of the participants are in an electronic conversation, group notification program 122 would deem this a match. If only two of those participants are engaged in an electronic conversation, then group notification program 122 would not determine this to be a match. If an additional participant or participants joined a conversation with the previous three participants, group notification program 122 might still determine that there is a match. In another embodiment, group notification program 122 may create suggested preference settings based upon a list of frequently contacted participants of instant messaging service 120. Embodiments may include an instance where group preference settings 126 could be generated by group notification program 122 from frequently emailed recipients or text message recipients. In any of the aforementioned embodiments, as well as other alternative embodiments, group notification program 122 may determine if there are any matches by cross referencing current electronic conversations taking place on instant messaging service 120 or 140 and participants from group preference settings 126. In another embodiment, an electronic conversation may have to be ongoing for a specific amount of time for group notification program 122 to deem that there is a match with preference settings 126. In such an embodiment, the user of client computer 104 may have group preference settings 126 set so that only if a group has been involved in a conversation for more than 5 minutes would it constitute a match. Another embodiment may require the electronic conversation to take place during a specific allotment of time. An example of this may include a user selecting in group preference settings 126 to only be notified when a conversation is happening between the hours of 9 am and 5 pm. Yet another embodiment may require location restrictions in group preference settings 126, where group notification program 122 would determine if there is a match based on the location proximities of the participants, the location proximities of the client and participants, or variations thereof. In an embodiment in which group notification program 122 determines no matches are found when comparing participants to preference settings (no branch, decision 312) the program goes to end.

In an instance where group notification program 122 compares participants to preference settings and determines there is a match (yes branch, decision 312), group notification program 122 displays a notification of the ongoing electronic conversation on client computer 104 (step 314). In one embodiment this notification may include the participant names, or instant messaging service 120 user names, that are involved in an electronic conversation along with the total number of participants involved. Other embodiments may also comprise notifications that include a title of the conversation (if supported by the instant messaging service), key words, the time that the conversation started, participants that were previously involved in the conversation, etc. An embodiment could also list the creator of the group, and/or the list of users of instant messaging service 120 that were originally invited. In an embodiment that has a user or users that are utilizing privacy program 124 to hide their status, the hidden member would not be included in listed members of the notification but could possibly be included toward the total number of participants listed in the notification. An embodiment may exist where it would also be possible to have the entire conversation hidden depending on the privacy settings. In alternate embodiments, an instant messaging window could open to allow the user of client computer 104 to send a message to a member of the conversation to determine if they should be included or to ask for an invitation to the group conversation.

Figure 4:
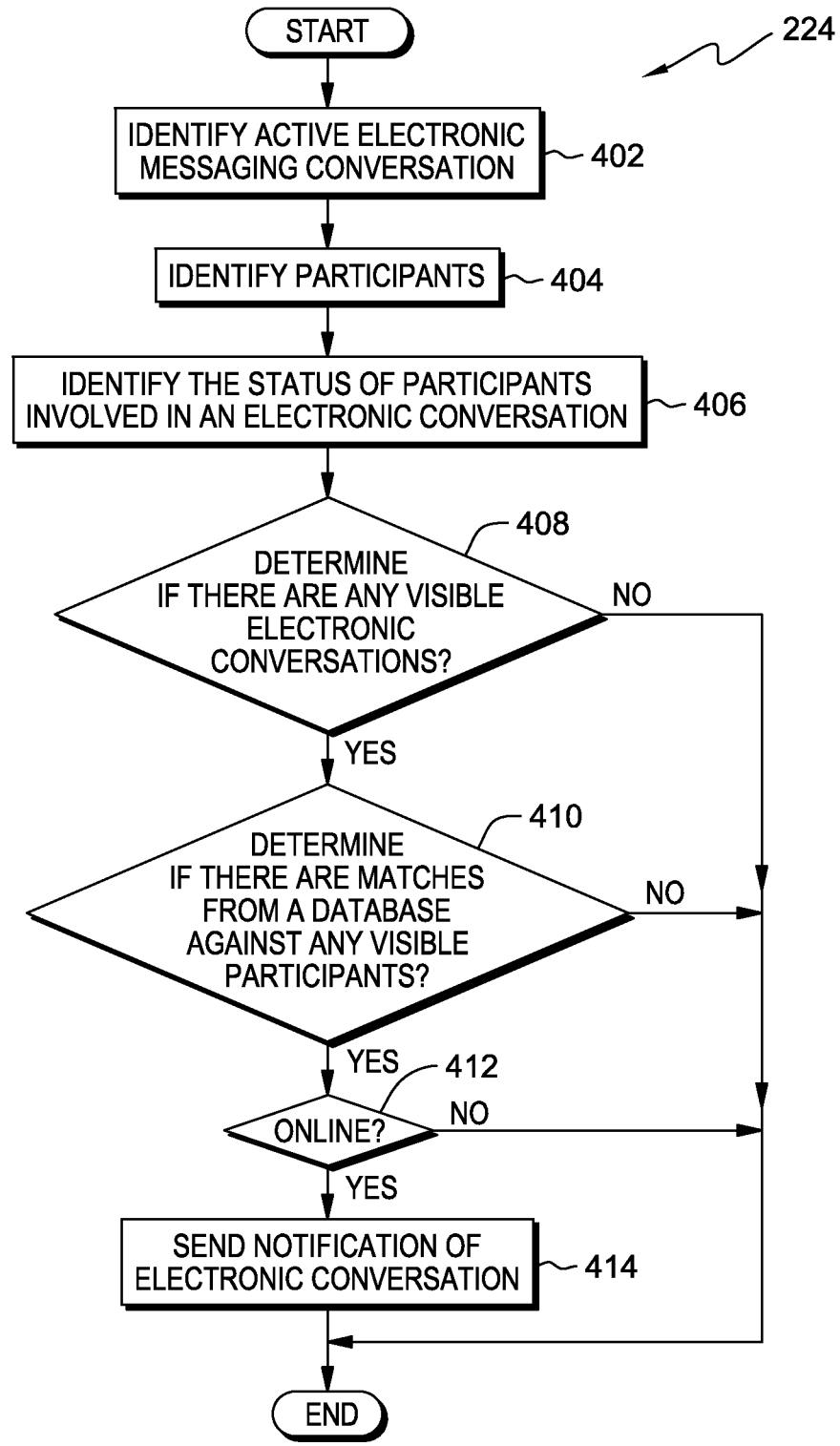
FIG. 4 is a flowchart depicting operational steps of one exemplary implementation of a group notification program located on a server computer, within the data processing environment, providing notifications of ongoing electronic conversations with more than one participant, in accordance with an embodiment of the present invention.

FIG. 4 is a flowchart depicting operational steps of one exemplary implementation of a group notification program 224, located on server computer 202, providing notifications of ongoing electronic conversations with more than one participant, in accordance with an embodiment of the present invention.

Group notification program 224 identifies active electronic conversations on instant messaging service 220 located on server computer 202 (step 402). In one embodiment, group notification program 224 queries instant messaging service 220 at a preset interval to identify all active electronic conversations. An example of this could comprise group notification program 224 querying instant messaging service 220 every 5 seconds for ongoing electronic conversations. In another embodiment, group notification program 224 could identify new electronic conversations that have been started since the last query. In an embodiment, group notification program 224 could conserve resources by only running its program on new electronic conversations. In yet another embodiment, group notification program 224 may continually update its list of active electronic conversations. Another embodiment may include group notification program 224 automatically receiving the updates from instant messaging service 220, or group notification program 224 identifying new electronic conversations hosted by instant messaging service 220.

Group notification program 224 identifies the participants of the ongoing electronic conversations (step 404). In an embodiment, group notification program 224 could identify the participants of the electronic conversations by querying instant messaging service 220 for participant identifications when it identifies that an active electronic conversation is ongoing. In another embodiment, group notification program 224 could send a secondary query to instant messaging service 220 to identify the participants of an electronic conversation once it has identified that an electronic conversation is taking place. An example of participants could be multiple users of instant messaging service 220, other instant messaging services if they are compatible, or an automated computer.

Group notification program 224 identifies the status of the participants currently engaged in electronic conversations via instant messaging service 220 (step 406). In an embodiment, group notification program 224 could query instant messaging service 220 to determine if participants of an electronic conversation are allowing their status to be divulged to other users of instant messaging service 220. In another embodiment, group notification program 224 could query a client computer for the status of an electronic conversation participant. In yet another embodiment, there may be privacy program 222 located on server computer 202, or privacy program 242 located on client computer 204 that would need to be queried by group notification program 224. An example of a status could include a participant of an electronic conversation allowing all users of instant messaging service 220 to be notified of who they were in an electronic conversation with. Another example could comprise a varied status in which the user of instant messaging service 220 only allows certain users to see who they are engaged in an electronic conversation with, while other users may be blocked from knowing who they were in an electronic conversation with, or that they are even involved in an electronic conversation.

Group notification program 224 determines if there are active electronic conversations in which participants allow information regarding their status to be forwarded (decision 408). After receiving the information about the ongoing electronic conversation and the status of the participants, group notification program 224 determines if there are any matches that allow for dissemination of the electronic conversation information. In one embodiment, group notification program 224 may create a list of electronic conversations for which the information of participants could be forwarded to other users. In another embodiment, group notification program 224 may create a list of electronic conversations to disregard in further steps because the participants have settings in place to block dissemination of their information. In an embodiment in which group notification program 224 determines that there are no participants that allow information to be forwarded (no branch, decision 408) the program goes to end.

If group notification program 224 determines that there are participants that are allowing their information to be forwarded (yes branch, decision 408), group notification program 224 determines if there are matches from group preference settings 230, and the list of ongoing electronic conversations (decision 410). As mentioned in the description of FIG. 3, an embodiment may comprise an instance where these preferences could be related to the particular participants, the location of the participants, a specific time, and the amount of time that the participants have been engaged in an electronic conversation. In an instance in which group notification program 224 determines that there are no matches from group preference settings 230 and the list of ongoing electronic conversations (no branch, decision 410), the program would go to end.

In one embodiment group notification program 224 may search individualized contact lists, stored in contact list 232, of the participants involved in a specific electronic conversation that allow their status to be disseminated. Upon retrieving contacts list 232 for the participants, it may then search group preference settings 230 of contacts list 232 to determine if there are any matches with the participants of the electronic conversation that triggered the search. An example of this could be, participant A is engaged in an electronic conversation with participant B on instant messaging service 220. Group notification program 224 may search contact list 232 for both participant A and participant B. Group notification program 224 then searches group preference settings 230 for the located contacts. If a contact's group preference settings 230 are the same as the particulars of the ongoing electronic conversation, group notification program 224 would determine there is a match.

Another embodiment could comprise group notification program 224 querying client computer 204 of the participants involved in an electronic communication via instant messaging service 220. In this embodiment group notification program 224 would query a client computer for information such as an address book, recent emails, recent telephone calls, recent gaming messages or interactions, etc. Once group notification program 224 obtained this information, it could then search for those contacts on instant messaging service 220. After populating a list of contacts that were located on client computer 204 that are members of instant messaging service 220, group notification program 224 could then search group preference settings 230 for each located contact to determine if the settings match the specifics of the electronic conversation that initiated the search.

An embodiment of group notification program 224 may upload metadata to each user of instant messaging service 220 with a list of people that "follow" the user in its group preference settings 230. "Following", as used herein, means that a user has added a particular contact to their group preference settings 230, such that the user will be notified of certain activities of the contact, e.g., participating in an electronic conversation, if certain conditions are met, e.g., an electronic conversation being with particular other users, chat lasting threshold length of time, physical proximity of participants, etc. In one embodiment, this information may not be available to the users but is just for use by group notification program 224 located on server 202. This would allow group notification program 224 to review preference settings 230 for the followers of each participant involved in an electronic conversation on instant messaging service 220 and determine if there are any matches between preference settings 230 and the specifics of the ongoing electronic conversation. In one example, a parent may want to keep track of whom their child may be involved in electronic conversations with. By including the child in the parents preference settings 230, instant messaging service 220 might save that information in association with the child's user name. If the child is involved in an electronic conversation utilizing instant messaging service 220, then group notification program 224 may be able to search the metadata of each participant of their electronic conversations, including the child, to determine users that might have an interest (e.g., the parent). Group notification program 224 may then search preference settings 230. For example, child C has follower parent P and is involved in an electronic conversation with friend F. If F is also followed by P, and an electronic conversation between the two participants fits the specifics for P's group preference settings 230, then group notification program 224 would determine that there is a match.

When group notification program 224 determines that there is a match from group preference settings 230 to the list of active electronic conversations (yes branch, decision 410), group notification program 224 determines if the client computer for the user to be notified is logged onto instant messaging service 220 (decision 412). In an embodiment, group notification program 224 receives information from instant messaging service 220 to determine if the user to be notified is currently logged onto instant messaging service 220. In another embodiment, group notification program 224 may query instant messaging service 220 to determine if the user to be notified status would allow a notification. An example of this may comprise the status of a user to be notified stating they are in a meeting in which case the user may not want to be notified. In another example, the user may have set group preference settings 230 to send a notification regardless of the user's status if an electronic conversation specific participants or other group preference settings were identified. In an embodiment when group notification program 224 determines that the user to be notified is not logged onto instant messaging service 220 (no branch, decision 412) the program would go to end.

If group notification program 224 determines that the user to be notified is logged onto instant messaging service 220 (yes branch, decision 412), group notification program 224 sends a notification to a user of instant messaging service 240 on client computer 204 (step 414). In an embodiment of the invention, once it is determined that there is a match of an electronic conversation specifics with a user's preference settings, a notification is sent to client computer 204 from server computer 202 via network 212. In an embodiment, group notification program 224 may send a notification to instant messaging service 220 located on server computer 202, which would then send a notification to instant messaging service 240, located on client computer 204. Instant messaging service 240 would then display a notification to the user. In one embodiment, the notification may comprise the instant messaging service 220 user names. In another embodiment, the notification may include items as listed in the description of FIG. 3 (step 314). In yet another embodiment, group notification program 224 may send the notification by means of text message, automated phone call, email, page, pop-up window, etc.

Figure 5:
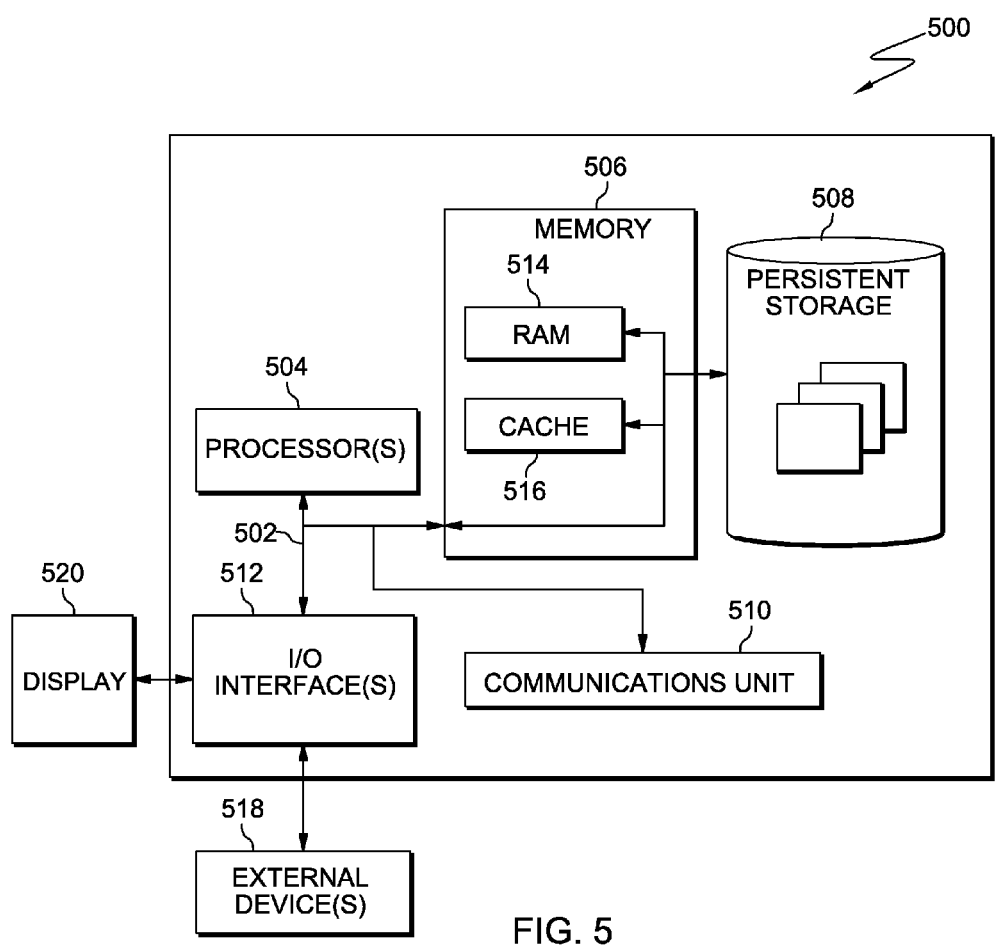
FIG. 5 depicts a block diagram of components of a computer executing the group notification program, e.g. the client computer or server computer, in accordance with an embodiment of the present invention.

FIG. 5 depicts a block diagram of components of data processing system 500, in accordance with an illustrative embodiment of the present invention. Data processing system 500 is representative of any computer system operating group notification program; for example, client computer 104 or server computer 202. It should be appreciated that FIG. 5 provides only an illustration of one implementation and does not imply any limitations with regard to the environments in which different embodiments may be implemented. Many modifications to the depicted environment may be made.

Data processing system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage medium.

Group notification program 122, or 224, is stored in persistent storage 508 for execution by one or more of computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by data processing system 100 and 200. In these examples, communications unit 510 includes one or more wireless network interface cards. Communications unit 510 may provide communications through the use of either or both physical and wireless communications links. Computer programs and processes, such as group notification program 122, and 224, may be downloaded to persistent storage 508 through communications unit 510.

I/O interface(s) 512 allows for input and output of data with other devices that may be connected to data processing system 500. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520.

Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for notifying a user of an electronic conversation, the method comprising:
   identifying, by one or more computer processors, an electronic conversation on an instant messaging service between a plurality of participants, wherein the plurality of participants does not include the user;
   identifying, by one or more computer processors, the plurality of participants;
   determining, by one or more computer processors, whether the plurality of participants match a specific list of participants that have been predetermined to be of interest to the user wherein the specific list of participants includes recent social media interactions and wherein determining whether the plurality of participants match the specific list of participants comprises:
      querying a computer of a participant from the plurality of participants for one or more contacts of the participant, wherein one of the one or more contacts is the user;
      identifying, by one or more computer processors, a specific list of participants of interest to the user;
      comparing, by one or more computer processors, the specific list of participants of interest to the user to the identified plurality of participants, wherein comparing the specific list of participants of interest to the user to the identified plurality of participants comprises:
         identifying metadata for a participant from the identified plurality of participants, wherein the metadata identifies the user as having the participant in the specific list of participants of interest to the user; and
         comparing, by one or more computer processors, the specific list of participants of interest to the user to the identified plurality of participants; and
      determining if a quorum of the specific list of participants are involved in the conversation; and
   in response to determining that the plurality of participants engaged in the electronic conversation matches the specific list of participants of interest to the user, notifying the user of the electronic conversation, wherein the electronic conversation is currently ongoing, and including a listing of participants currently involved in the conversation.

2. The method of claim 1, further comprising:
   determining, by one or more computer processors, a current duration of the electronic conversation;
   determining, by one or more computer processors, if the current duration meets or exceeds a threshold duration, wherein the threshold duration was preset by the user; and
   in response to exceeding the threshold duration, notifying, by one or more computer processors, the user of the electronic conversation.

3. The method of claim 1 further comprising:
   determining, by one or more computer processors, a specific time of the electronic conversation;
   determining, by one or more computer processors, if the specific time of the electronic conversation is within an established range of time, wherein the established range of time was preset by the user; and
   in response to the specific time of the electronic conversation occurring within the established range of time, notifying, by one or more computer processors, the user of the electronic conversation.

4. The method of claim 1, further comprising:
   determining, a physical location of a participant from the plurality of participants;
   determining, a distance between the participant and another participant from the plurality of participants;

determining, by one or more computer processors, if the distance between the participant and the other participant meets or exceeds a threshold; and in response to exceeding the threshold distance, notifying, by one or more computer processors, the user of the electronic conversation.

5. The method of claim 1, wherein identifying the electronic conversation between the plurality of participants comprises:

querying a server computer for information indicating that a contact of the user, located in the specific list of participants, is engaged in conversation; and receiving from the server computer information that the contact is engaged in conversation.

6. The method of claim 1, wherein identifying the plurality of participants comprises:

identifying, by one or more computer processors, a privacy status of a participant from the plurality of participants;

determining, by one or more computer processors, if the privacy status does not allow information regarding the participant to be disseminated to the user; and in response to determining if the privacy status does not allow information regarding the participant to be disseminated to a user, removing the participant from the plurality of participants.

7. A computer program product for notifying a user of an electronic conversation, the computer program product comprising:

one or more computer readable storage media and program instructions stored on the one or more computer readable storage media, the program instructions comprising:

identifying, by one or more computer processors, an electronic conversation on an instant messaging service between a plurality of participants, wherein the plurality of participants does not include the user;

identifying, by one or more computer processors, the plurality of participants;

determining, by one or more computer processors, whether the plurality of participants match a specific list of participants that have been predetermined to be of interest to the user, wherein the specific list of participants includes recent social media interactions and wherein determining whether the plurality of participants match the specific list of participants comprises:

querying a computer of a participant from the plurality of participants for one or more contacts of the participant, wherein one of the one or more contacts is the user;

identifying, by one or more computer processors, a specific list of participants of interest to the user;

comparing, by one or more computer processors, the specific list of participants of interest to the user to the identified plurality of participants, wherein comparing the specific list of participants of interest to the user to the identified plurality of participants comprises:

identifying metadata for a participant from the identified plurality of participants, wherein the metadata identifies the user as having the participant in the specific list of participants of interest to the user; and comparing, by one or more computer processors, the specific list of participants of interest to the user to the identified plurality of participants; and determining if a quorum of the specific list of participants are involved in the conversation; and in response to determining that the plurality of participants engaged in the electronic conversation matches the specific list of participants of interest to the user, notifying the user of the electronic conversation, wherein the electronic conversation is currently ongoing, and including a listing of participants currently involved in the conversation.

8. The computer program product of claim 7, further comprising program instructions, stored on at least one of the one or more computer readable storage media:

to determine a specific time of the electronic conversation;

to determine if the specific time of the electronic conversation is within an established range of time, wherein the established range of time was preset by the user; and in response to the specific time of the electronic conversation occurring within the established range of time, program instructions to notify the user of the electronic conversation.

9. The computer program product of claim 7, further comprising program instructions, stored on at least one of the one or more computer readable storage media:

to determine a physical location of a participant from the plurality of participants;

to determine a distance between the participant and another participant from the plurality of participants;

to determine if the distance between the participant and the other participant meets or exceeds a threshold; and in response to exceeding the threshold distance, program instructions to notify the user of the electronic conversation.

10. The computer program product of claim 7, wherein the program instructions to identify the electronic conversation between the plurality of participants comprise:

program instructions to query a server computer for information indicating that a contact of the user, located in the specific list of participants, is engaged in conversation; and program instructions to receive from the server computer information that the contact is engaged in conversation.

11. The computer program product of claim 7, wherein identifying the plurality of participants comprises:

program instructions to identify a privacy status of a participant from the plurality of participants;

program instructions to determine if the privacy status does not allow information regarding the participant to be disseminated to the user; and in response to determining if the privacy status does not allow information regarding the participant to be disseminated to a user, program instructions to remove the participant from the plurality of participants.

12. A computer system for notifying a user of an electronic conversation, the computer system comprising:

one or more computer processors;

one or more computer readable storage media;

program instructions stored on the computer readable storage media for execution by at least one of the one or more computer processors, the program instructions comprising:

identifying, by one or more computer processors, an electronic conversation on an instant messaging service between a plurality of participants, wherein the plurality of participants does not include the user;

identifying, by one or more computer processors, the plurality of participants;

determining, by one or more computer processors, whether the plurality of participants match a specific list of participants that have been predetermined to be of interest to the user, wherein the specific list of participants includes recent social media interactions and wherein determining whether the plurality of participants match the specific list of participants comprises:

querying a computer of a participant from the plurality of participants for one or more contacts of the participant, wherein one of the one or more contacts is the user;

identifying, by one or more computer processors, a specific list of participants of interest to the user;

comparing, by one or more computer processors, the specific list of participants of interest to the user to the identified plurality of participants, wherein comparing the specific list of participants of interest to the user to the identified plurality of participants comprises:

identifying metadata for a participant from the identified plurality of participants, wherein the metadata identifies the user as having the participant in the specific list of participants of interest to the user; and comparing, by one or more computer processors, the specific list of participants of interest to the user to the identified plurality of participants; and determining if a quorum of the specific list of participants are involved in the conversation; and in response to determining that the plurality of participants engaged in the electronic conversation matches the specific list of participants of interest to the user, notifying the user of the electronic conversation, wherein the electronic conversation is currently ongoing, and including a listing of participants currently involved in the conversation.

13. The computer system of claim 12, further comprising program instructions, stored on at least one of the one or more computer readable storage media for execution by at least one of the one or more computer processors, to:

to determine a specific time of the electronic conversation;

to determine if the specific time of the electronic conversation is within an established range of time, wherein the established range of time was preset by the user; and in response to the specific time of the electronic conversation occurring within the established range of time, program instructions to notify the user of the electronic conversation.

14. The computer system of claim 12, further comprising program instructions, stored on at least one of the one or more computer readable storage media for execution by at least one of the one or more computer processors, to:

determine a physical location of a participant from the plurality of participants;

determine a distance between the participant and another participant from the plurality of participants;

to determine if the distance between the participant and the other participant meets or exceeds a threshold; and in response to exceeding the threshold distance, program instructions to notify the user of the electronic conversation.

15. The method of claim 1, wherein determining recent contacts comprises:

querying, by one or more computer processors, a client computer for contacts in an address book, a recent emails, a recent telephone calls, and a recent gaming messages and interactions.

16. The computer system of claim 12, wherein identifying the electronic conversation between the plurality of participants comprises:

program instructions to query a server computer for information indicating that a contact of the user, located in the specific list of participants, is engaged in conversation; and program instructions to receive from the server computer information that the contact is engaged in conversation.

17. The computer system of claim 12, wherein identifying the plurality of participants comprises:

program instructions to identify a privacy status of a participant from the plurality of participants;

program instructions to determine if the privacy status does not allow information regarding the participant to be disseminated to the user; and in response to determining if the privacy status does not allow information regarding the participant to be disseminated to a user, program instructions to remove the participant from the plurality of participants.

\* \* \* \* \*